(12) United States Patent
Katyal

(10) Patent No.: US 10,876,772 B2
(45) Date of Patent: Dec. 29, 2020

(54) SYSTEM AND METHOD FOR SIMULTANEOUS EVAPORATION AND CONDENSATION IN CONNECTED VESSELS

(71) Applicant: Amit Katyal, New Delhi (IN)

(72) Inventor: Amit Katyal, New Delhi (IN)

( * ) Notice: Subject to any disclaimer, the term of this patent is extended or adjusted under 35 U.S.C. 154(b) by 225 days.

(21) Appl. No.: 15/565,539

(22) PCT Filed: Apr. 13, 2016

(86) PCT No.: PCT/IN2016/000097
§ 371 (c)(1),
(2) Date: Oct. 10, 2017

(87) PCT Pub. No.: WO2016/166768
PCT Pub. Date: Oct. 20, 2016

(65) Prior Publication Data
US 2018/0106511 A1    Apr. 19, 2018

(30) Foreign Application Priority Data

Apr. 17, 2015 (IN) ............................ 1079/DEL/2015
Jun. 1, 2015 (IN) ............................ 1568/DEL/2015
Feb. 23, 2016 (IN) ............................ 201611006190

(51) Int. Cl.
*F25B 29/00* (2006.01)
*C02F 1/04* (2006.01)
*B01D 1/02* (2006.01)
*B01D 5/00* (2006.01)
*B01D 3/34* (2006.01)
(Continued)

(52) U.S. Cl.
CPC .............. *F25B 29/003* (2013.01); *B01D 1/02* (2013.01); *B01D 3/346* (2013.01); *B01D 5/006* (2013.01);
(Continued)

(58) Field of Classification Search
CPC ........ B01D 1/02; B01D 1/2806; B01D 3/346; B01D 5/006; C02F 1/04; C02F 1/043;
(Continued)

(56) References Cited

U.S. PATENT DOCUMENTS 2,185,595 A * 1/1940 Kleinschmidt .......... B01D 3/00
123/41.21
3,492,205 A * 1/1970 Webber ..................... C02F 1/16
202/181
(Continued)

FOREIGN PATENT DOCUMENTS

CN        1445011 A1    1/2003
WO    2009157875 A1   12/2009

*Primary Examiner* — Eric S Ruppert
*Assistant Examiner* — Hans R Weiland
(74) *Attorney, Agent, or Firm* — Craft Chu PLLC; Andrew W. Chu

(57) ABSTRACT

A distillation system and process thereof are provided. The system includes an evaporation vessel having a system for heating a liquid contained therein and producing vapours thereof and a condensation vessel having a system for cooling and condensing the vapours produced in the evaporation vessel. A connecting pipe for connecting the evaporation vessel and the condensation vessel transfers the vapours from the evaporation vessel to the condensation vessel. The amount of vapours transferred from the evaporation vessel to the condensation vessel depends upon the pressure differential between the evaporation vessel and the condensation vessel and area of opening of the connecting pipe.

20 Claims, 10 Drawing Sheets

(51) Int. Cl.
*F25B 25/00* (2006.01)
*F25B 6/04* (2006.01)
*C02F 103/08* (2006.01)

(52) U.S. Cl.
CPC ............... *C02F 1/04* (2013.01); *C02F 1/043* (2013.01); *C02F 1/048* (2013.01); *C02F 2103/08* (2013.01); *F25B 6/04* (2013.01); *F25B 25/005* (2013.01); *F25B 2339/047* (2013.01)

(58) Field of Classification Search
CPC ...... C02F 1/048; C02F 1/041; C02F 2103/08; F25B 6/04; F25B 25/005; F25B 29/003; F25B 2239/045
See application file for complete search history.

(56) References Cited

U.S. PATENT DOCUMENTS

| | | | | |
|---|---|---|---|---|
| 3,783,108 | A | * | 1/1974 | Huhta-Koivisito ...... B01D 1/04 203/11 |
| 4,390,396 | A | * | 6/1983 | Koblenzer ............. B01D 3/001 134/12 |
| 4,985,122 | A | * | 1/1991 | Spencer ................... B01D 1/02 203/11 |
| 5,630,913 | A | * | 5/1997 | Tajer-Ardebili ....... B01D 3/007 202/176 |
| 8,444,830 | B2 | * | 5/2013 | Davey ................... B01D 5/006 203/10 |
| 2003/0057165 | A1 | * | 3/2003 | Carson ................. F25B 29/003 210/774 |

* cited by examiner

| TEMPERATURE (CELCIUS) | PRESSURE (BARA) |
|---|---|
| 5 | 0.00855 |
| 10 | 0.0121 |
| 15 | 0.0168 |
| 20 | 0.023 |
| 25 | 0.0313 |
| 30 | 0.0418 |
| 35 | 0.0555 |
| 40 | 0.0728 |
| 45 | 0.0946 |
| 50 | 0.1217 |

TABLE 1

SYSTEM AND METHOD FOR SIMULTANEOUS EVAPORATION AND CONDENSATION IN CONNECTED VESSELS

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention is directed to a highly efficient distillation process and an apparatus thereof and more particularly, the present invention is directed to a highly efficient water distillation process.

2. Description of Related Art Including Information Disclosed Under 37 CFR 1.97 and 37 CFR 1.98

One of the most effective techniques for purifying water is to distill it. In distillation, the water to be purified is heated to the point at which it evaporates, and the resultant vapour is then condensed. Since the vapour leaves almost all impurities behind in the input feed water, the condensate that results is typically of a purity much higher in most respects than the output of most competing purification technologies.

Generally speaking, distillation systems used for water purification rely on the evaporation of water containing contaminants, so as to produce steam which is essentially free of contaminants. This evaporation process is energy intensive because of the high value of the latent heat of evaporation of water at boiling temperatures. This amount of energy is in addition to the energy required to bring water temperatures to the boiling point, which depends on the temperature of the feed water. Thus, the amount of energy that needs to be imparted to produce an acceptable rate of evaporation is high, so distillation is expensive if most of the energy is not recovered. Such energy recovery is crucial if any efficiency is to be achieved. Water distillation without energy recovery is not commercially viable for water purification applications.

Several variations have been developed to overcome the problems with conventional distillation methods.

In one of the existing solutions, a conventional vapour recompression circuit together with a uniquely configured forced convection heat recovery and transfer circuit for maximizing heat transfer and maintaining the desired forced convection circuit non-conductive to scaling exchangers is provided.

In another solution, a method of removing dissolved solids from a waste stream through an evaporation-crystallization process operating at a relatively low temperature. A waste stream is directed to an evaporator. The waste stream is heated in the evaporator at a temperature less than 60° C. at a pressure less than atmospheric pressure. Water forming a part of the waste stream is evaporated which causes the waste stream to be concentrated, resulting in dissolved solids precipitating and crystallizing and which results in the formation of a slurry stream. The slurry stream is directed to a liquid-solid separator which separates the crystallized solids from the slurry.

While a number of prior solutions/mechanism have been developed for the intended purpose, there is a continuing need for an evaporation-crystallization process and system that is economical, efficient, less complex and more operationally flexible in comparison to the existing mechanisms. What is needed is a mechanism for heat recovery that is not limited to heat conductivity, that can efficiently transfer large amounts of heat per unit of surface, and that is relatively inexpensive to manufacture. A further need is to provide an inexpensive and efficient distillation systems.

BRIEF SUMMARY OF THE INVENTION

In an embodiment, a distillation system is provided. The system includes an evaporation vessel having means for heating a liquid contained therein and producing vapours thereof and a condensation vessel having means for cooling and condensing the vapours produced in the evaporation vessel. A connecting pipe for connecting the evaporation vessel and the condensation vessel and for transferring the vapours from the evaporation vessel to the condensation vessel, wherein the amount of vapours transferred from the evaporation vessel to the condensation vessel depends upon the pressure differential between the evaporation vessel and the condensation vessel and area of opening of the connecting pipe.

In another embodiment, a distillation method is provided. The method includes heating a liquid contained in an evaporation vessel and producing vapours thereof and transferring the vapours from the evaporation vessel to a condensation vessel through a connecting pipe; wherein the amount of vapours transferred from the evaporation vessel to the condensation vessel depends upon the pressure differential between the evaporation vessel and the condensation vessel and area of opening of the connecting pipe. The method further includes cooling/condensing the vapours transferred from the evaporation vessel to the condensation vessel.

BRIEF DESCRIPTION OF THE SEVERAL VIEWS OF THE DRAWINGS

To further clarify advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

These and other features, aspects, and advantages of the present invention will become better understood when the following detailed description is read with reference to the accompanying drawings in which like characters represent like parts throughout the drawings.

DETAILED DESCRIPTION OF THE INVENTION

Figure 1:
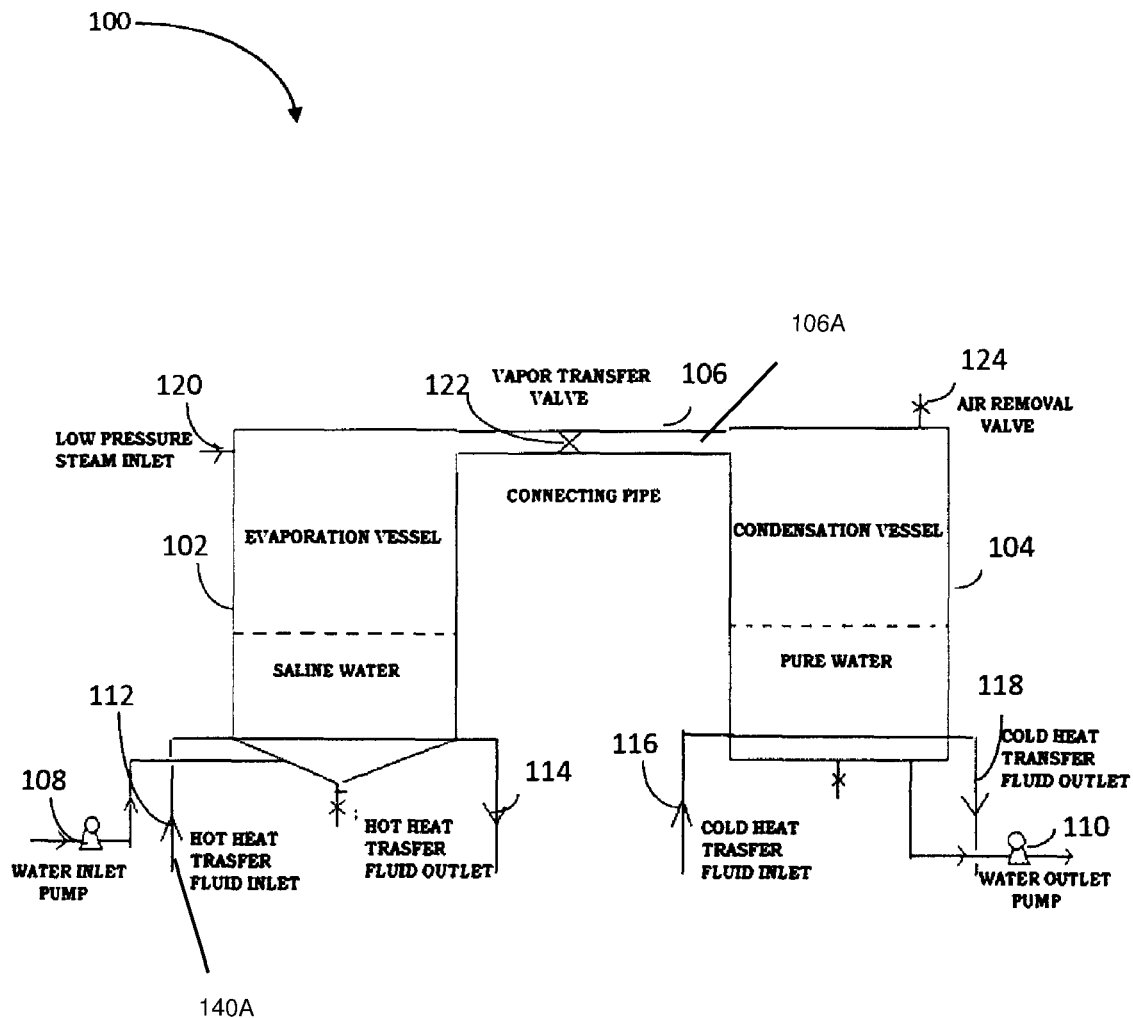
FIG. 1 shows a schematic view of a distillation system in accordance with an embodiment of the invention.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are exemplary and explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this invention belongs. The system, methods, and examples provided herein are illustrative only and not intended to be limiting.

Embodiments of the present invention will be described below in detail with reference to the accompanying drawings.

FIG. 1 illustrates a distillation system 100 in accordance with an embodiment of the invention. The system comprises of two vessels i.e. an evaporation vessel 102 and a condensation vessel 104 connected to each other through their vapor spaces by a connecting pipe 106 having an opening 106A with an area. The evaporation vessel 102 has provision of heating whereas the condensation vessel 104 has provision of cooling through internal or external heat transfer coils. The system 100 further includes a liquid inlet pump or water inlet pump 108 in FIG. 1 for pumping in saline water and a water outlet pump 110 for pumping out pure water. The system is further provided with hot heat transfer fluid inlet 112 with a heat transfer fluid 140A and outlet 114; hot heat transfer fluid flow control valve; cold heat transfer fluid inlet 116 and outlet 118 and cold heat transfer fluid flow control valve for allowing the hot heat transfer fluid and cold heat transfer fluid to enter in and exit out of the system 100. The system 100 is further provided with a vapor inlet or a low pressure steam inlet 120 in FIG. 1 for supplying low pressure steam to the evaporation vessel 102 to replace air in the condensation vessel 104 and evaporation vessel 102. The system 100 further includes a vapour transfer valve 122 having a flow rate of vapor for varying the area of opening 106A the connecting pipe 106 to control the transfer of vapours and an air removal valve 124 for removing air from the system. Optionally, a demister could be placed in the evaporation vessel 102 to prevent entrainment of saline water along with water vapours to the condensation vessel 104. A regular supply of hot heat transfer fluid and cold heat transfer fluid preferably at constant temperatures is ensured to heat the evaporation vessel 102 and cool the condensation vessel 104 respectively. Water, glycol, low pressure steam or any other suitable heat transfer fluid can be used in the system 100. Other conductive, convective or radiative methods of heating like electric heaters, gas fired heaters or solar heaters and of cooling like fans or water wetting ice covering of outer surface could also be used. The molar rate of evaporation and condensation of water could be adjusted by changing any of the following:

1. flow rate or temperature of hot heat transfer fluid
2. flow rate or temperature of cold heat transfer fluid
3. area of opening of vapour transfer valve 122 configured in the connecting pipe 106 or any combination of these.

The complete distillation system 100 including the evaporation vessel 102, the condensation vessel 104, and the connecting pipe 106 is insulated to prevent any heat exchange with the atmosphere. Also, the evaporation vessel 102, the condensation vessel 104 and the connecting pipe 106 are made air-tight not allowing any air to enter the distillation system 100 while in operation.

The rate of transfer of water vapours transferred from evaporation vessel 102 to condensation vessel 104 depends on the pressure differential between evaporation vessel 102 and condensation vessel 104 and area of opening of connecting pipe 106 connecting evaporation vessel 102 and condensation vessel 104. Pressure of evaporation vessel 102 and condensation vessel 104 depends on the temperature of evaporation vessel 102 and condensation vessel 104 and is equal to vapour liquid equilibrium pressure of saline water in evaporation vessel 102 and desalinated water in condensation vessel 104 corresponding to the maintained temperature. The amount of water evaporated from evaporation vessel 102 and condensed in condensation vessel 104 depends on heat transfer area of coils placed externally or internally in the evaporation vessel 102 and condensation vessel 104 and the flow rate and temperature of hot and cold heat transfer fluid flowing in the coils.

For a small increment in time, salinity of water remaining in the evaporation vessel 102 can be considered constant. For this small time increment, as the flow rate of hot heat transfer fluid in the evaporation vessel 102 is lowered for a fixed flow rate of cold heat transfer fluid in condensation vessel 104, the rate of evaporation in evaporation vessel 102 decreases. This results in decrease in pressure of evaporation vessel 102 due to decrease in number of moles in vapour space of evaporation vessel 102. As the pressure of evaporation vessel 102 decreases, the temperature of evaporation vessel 102 which is equal to the vapour liquid equilibrium temperature of saline water also decreases. Also, the decrease in pressure of evaporation vessel 102 results in lower pressure differential between evaporation vessel 102 and condensation vessel 104 and a lower rate of transfer of water vapours from evaporation vessel 102 to condensation vessel 104.

As less water vapours at lower temperature are transferred to the condensation vessel 104 from evaporation vessel 102 for same flow rate of cold heat transfer fluid in condensation vessel 104 so the pressure of condensation vessel 104 and temperature of condensation vessel 104 (which is equal to vapour liquid equilibrium temperature of pure water corresponding to pressure of condensation vessel 104) decreases. However, this decrease in pressure of condensation vessel 104 is less than the decrease in pressure of evaporation vessel 102 as the flow rate of cold heat transfer fluid in condensation vessel 104 is unchanged whereas the flow rate of hot heat transfer fluid in evaporation vessel 102 has decreased. This results in an overall decrease in pressure difference between evaporation vessel 102 and condensation vessel 104 and an overall reduced rate of transfer of water vapours from evaporation vessel 102 to condensation vessel 104. The decrease in temperature of condensation vessel 104 results in lower outlet temperature of cold heat transfer fluid from condensation vessel 104 coil and a lower temperature difference between cold heat transfer fluid inlet temperature and outlet temperature at same cold heat transfer fluid flow rate. As the flow rate of cold heat transfer fluid in condensation vessel 104 is unchanged, lower rate of condensation of water vapours in condensation vessel 104 results as per equation 1 given below.

Rate of heat transfer ($Q$)=Mass flow rate of hot heat transfer fluid ($m$)*Specific heat of hot heat transfer fluid ($C$)*difference in inlet and outlet temperature of hot heat transfer fluid ($\Delta T$) (1)

A reverse effect results when the flow rate of hot heat transfer fluid is increased in the evaporation vessel 102. Similarly, when the flow rate of cold heat transfer fluid is decreased in the condensation vessel 104 and the flow rate of hot heat transfer fluid in evaporation vessel 102 is kept constant, an increase in temperature of condensation vessel 104 and a relatively lower increase in temperature of evaporation vessel 102 results. This results in lower rate of generation of water vapours, lower rates of transfer of water vapours and lower rates of condensation of water vapours. A reverse effect results with an increase in flow rate of cold heat transfer fluid in condensation vessel 104. For a fixed area of opening of the connecting pipe 106 and fixed temperature and flow rates of heat transfer fluids in heat transfer coils of evaporation vessel 102 and condensation vessel 104 for a small time increment in which salinity of water remaining in evaporation vessel 102 can be considered constant, an equilibrium state is automatically achieved. In such a case, the pressure and temperature of evaporation vessel 102 and condensation vessel 104 get adjusted such that same amount of water vapours are produced in the evaporation vessel 102, same amount of water vapours are transferred through the connecting pipe 106 from evaporation vessel 102 to condensation vessel 104 and same amount of water vapours are condensed in the condensation vessel 104 so as to maintain constant pressure and temperature in the evaporation vessel 102 and condensation vessel 104. As per ideal gas law for compressible vapours $$P*V=n*Z*R*T \quad (2)$$

In order to maintain the pressure and temperature in evaporation vessel 102 and condensation vessel 104 for a small time increment in which salinity of water remaining in evaporation vessel 102 can be considered constant, considering small change in vapour space volume and compressibility factor during this small time increment, number of moles in evaporation vessel 102 and condensation vessel 104 vapour space will remain the same. This implies that same number of moles of water vapours are produced in the evaporation vessel 102, same number of moles of water vapours are transferred through the connecting pipe 106 from evaporation vessel 102 to condensation vessel 104 and same number of moles of water vapours are condensed in the condensation vessel 104 for this small time increment. However, variation in pressure and temperature of evaporation vessel 102 and condensation vessel 104 with time outside this small time increment will be observed for the process due to variation of salinity of the saline water remaining in the evaporation vessel 102 with time.

In one embodiment, the present invention can also be used to separate liquid mixtures comprising of two or more miscible liquids with different volatilities. In such a case to separate liquid mixtures, liquid mixture is placed in the evaporation vessel 102 and cold heat transfer fluid is used to cool the condensation vessel 104 and hot heat transfer fluid is used to heat the evaporation vessel 102. Similar to the case of evaporation and condensation of water, for a fixed opening of the connecting pipe 106 and fixed temperature and flow rates of heat transfer fluids in heat transfer coils of evaporation vessel 102 and condensation vessel 104 for a small time increment in which the composition of liquid mixture remaining in the evaporation vessel 1 2 can be considered constant, an equilibrium state is automatically achieved wherein the pressure and temperature of evaporation vessel 102 and condensation vessel 104 get adjusted such that same number of moles gets evaporated in the evaporation vessel 102, same number of moles of vapours are transferred through the connecting pipe 106 from evaporation vessel 102 to condensation vessel 104 and same number of moles are condensed in the condensation vessel 104 for this small time increment. Also like desalination process carried out in the invention, a variation in pressure, temperature and composition of liquid and vapours in evaporation vessel 102 and condensation vessel 104 with time will be observed for evaporation and condensation of liquid mixtures. The system 100 can be stopped at a time when desired liquid mixture composition is achieved in either of the vessels resulting in separation of liquid mixture.

As the equilibrium pressure of saline water for a given temperature decreases with increasing salinity and as the salinity of leftover brine in the evaporation vessel 102 keeps on increasing as the desalination process continues so the pressure of evaporation vessel 102 decreases as the desalination process continues. This implies presence of lesser moles of water vapours in the vapour space of evaporation vessel 102 or lower rate of evaporation of water. The decrease in rate of evaporation of water with increasing salinity results in a higher outlet temperature of hot heat transfer fluid or higher temperature of evaporation vessel 102 as per equation 1. The decrease in pressure of evaporation vessel 102 with increased salinity results in a lower rate of transfer of water vapours from evaporation vessel 102 to condensation vessel 104. Though the temperature of water vapours being transferred from evaporation vessel 102 to condensation vessel 104 increases with increasing salinity, as the heat required to cool these water vapours to condensation temperature is very less so this decreased rate of transfer of water vapours from evaporation vessel 102 to condensation vessel 104 results in an overall decrease in pressure and temperature of condensation vessel 104. However the decrease in pressure of evaporation vessel 102 is more than the decrease in pressure of the condensation vessel 104 with increasing salinity resulting in lower pressure difference between evaporation vessel 102 and condensation vessel 104 and a lower rate of transfer of water vapours from evaporation vessel 102 to condensation vessel 104.

The final result of increased salinity is an increase in temperature of evaporation vessel 102 resulting in a lower rate of evaporation of saline water, a decrease in temperature of condensation vessel 104 resulting in a lower rate of condensation of water vapours and a lower pressure difference between evaporation vessel 102 and condensation vessel 104 resulting in lower rate of transfer of water vapours from evaporation vessel 102 to condensation vessel 104. So with increased salinity, the temperature of evaporation vessel 102 keeps on increasing and the temperature of condensation vessel 104 keep on decreasing such that an equilibrium state is maintained for a small time increment in which salinity of water remaining in the evaporation vessel 102 can be considered constant wherein water vapours are produced, transferred and condensed at same molar rate for this small time increment. However, this equilibrium state molar rate of water vapours produced, transferred and condensed decreases as the desalination process continues. A similar variation in temperature, pressure and molar flow rate is observed when the invention is used for evaporation and condensation of liquid mixtures.

Figure 2:
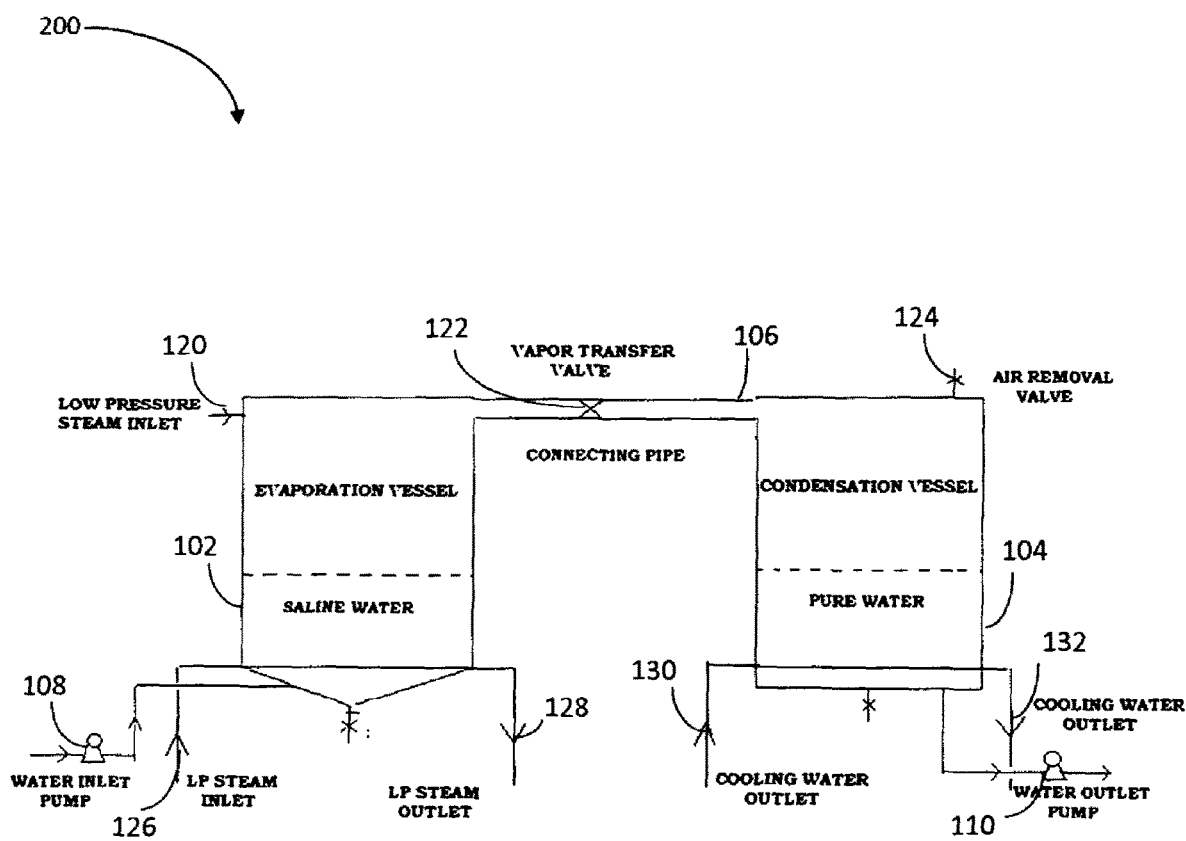
FIG. 2 shows a schematic view of a distillation system in accordance with an embodiment of the invention.

Any available hot or cold stream could be used as hot heat transfer fluid or cold heat transfer fluid with water at ambient temperature working as the cold heat transfer fluid or hot heat transfer fluid respectively to desalinate water using the invention. In a chemical plant, low pressure steam is used for heating process utilities and cooling water is used for cooling process utilities. Both low pressure steam and cooling water are generally available in a chemical plant at a constant temperature and pressure. In an embodiment as indicated in FIG. 2, the system 200 can be used to desalinate water and separate liquid mixtures by heating the evaporation vessel 102 using low pressure steam and cooling the condensation vessel 104 using cooling water. The system 200 further includes a low pressure (LP) steam inlet 126 for pumping in low pressure (LP) steam and a low pressure (LP) steam outlet 128 for pumping out low pressure (LP) steam. The system is further provided with cooling water inlet 130 for pumping in cooling water and a cooling water outlet 132 for pumping out cooling water. Depending on the flow rates and temperatures of low pressure steam and cooling water, the design parameters of the heat transfer coils and area of opening of connecting pipe 106, the temperature and pressure of evaporation vessel 102 and condensation vessel 104 will get automatically adjusted to evaporate and condense liquid at same molar rates. The embodiment is shown in FIG. 2.

Figure 3:
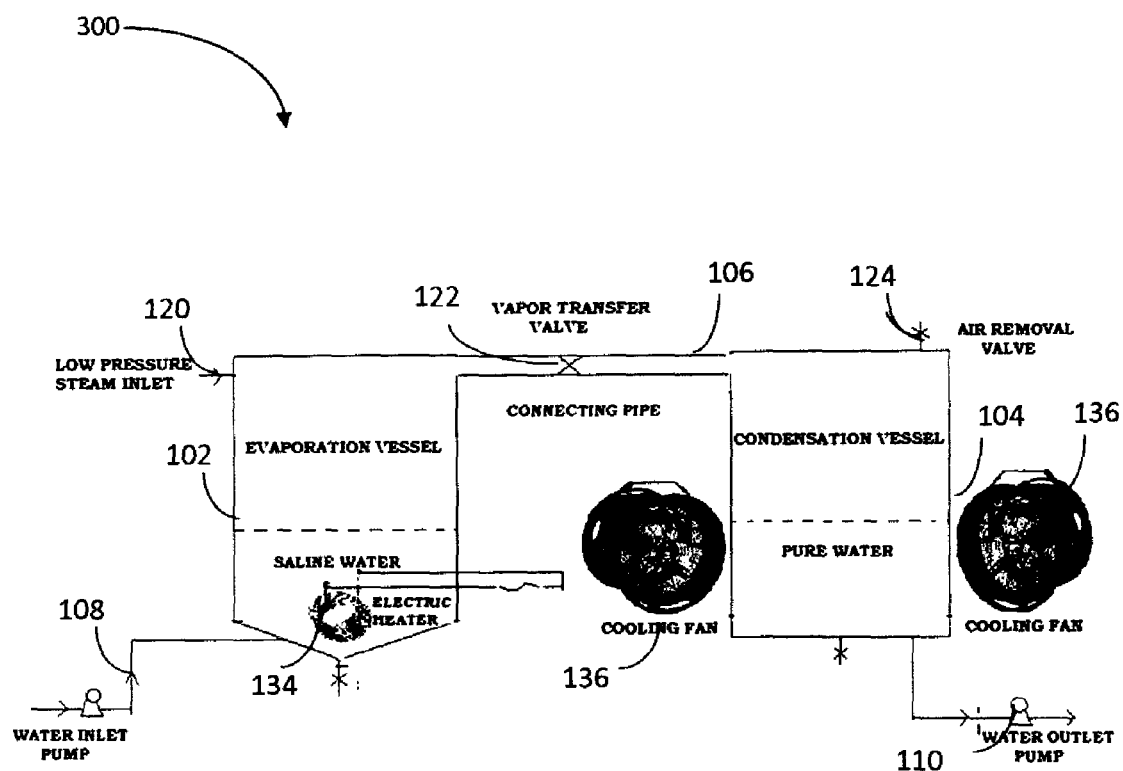
FIG. 3 shows a schematic view of a distillation system in accordance with an embodiment of the invention.

Referring to FIG. 3, another embodiment in accordance with the invention is illustrated. In this embodiment, other conductive, convective and radiative methods of heating and cooling are used. For example, electrical heaters or gas fired heaters or solar heaters 134 could be used to heat the evaporation vessel 102 and cooling fans 136 could be used to cool the condensation vessel 104 in system 300. Also, water-wetted or ice covered outer surface with ventilation with or without fans could cool the condensation vessel 104. A suitable temperature cut-off is configured in the heaters and vapour transfer valve 122 is adjusted such that the temperature of evaporation vessel 102 remains lower than the cut-off temperature to avoid repeated cut-offs and for effective and efficient working of the invention. The embodiment is shown in FIG. 3.

Figure 4:
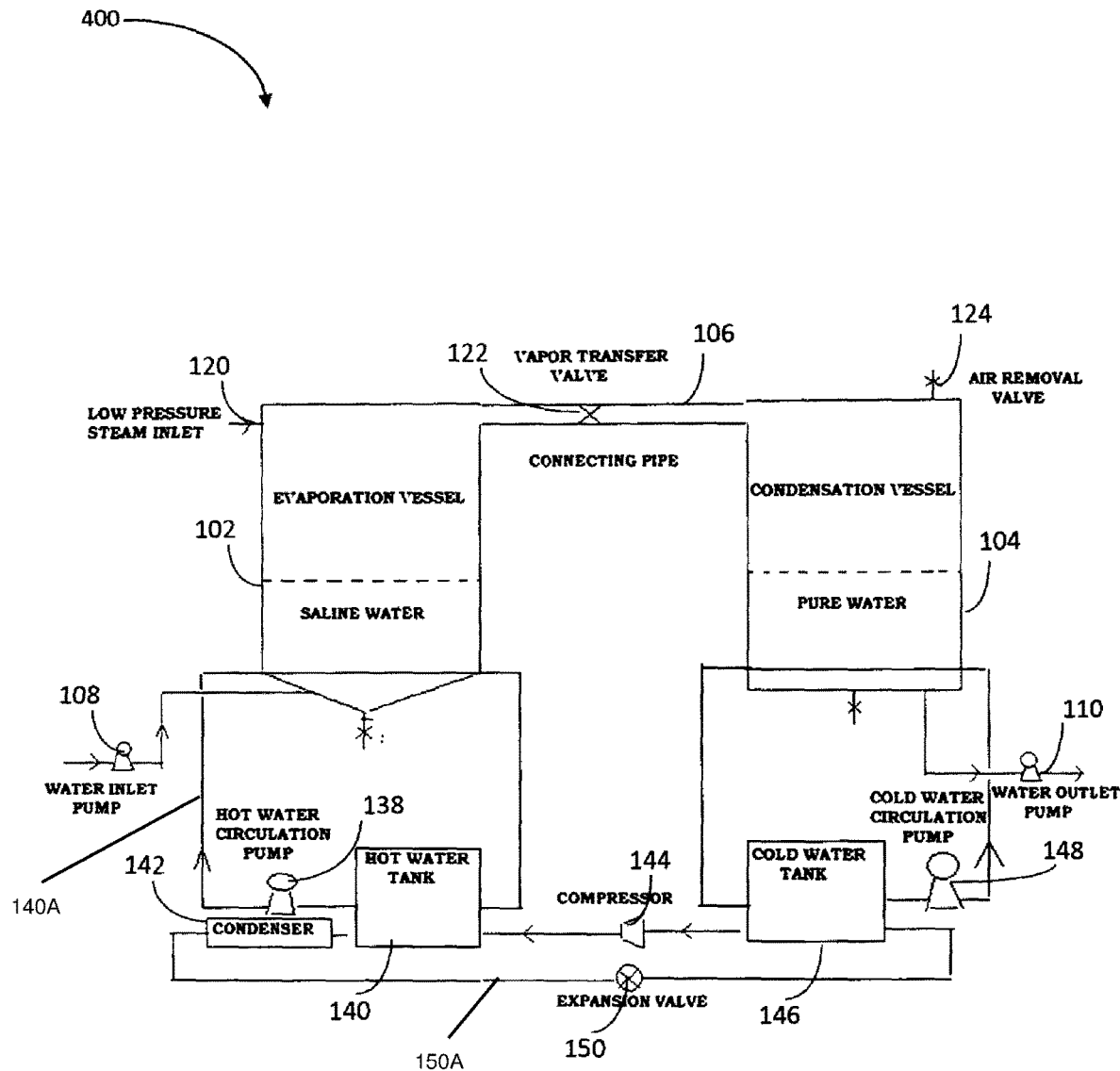
FIG. 4 shows a schematic view of a distillation system in accordance with an embodiment of the invention.

Referring to FIG. 4, another embodiment in accordance with the invention is illustrated. In the system 400 as per this embodiment, hot and cold heat transfer fluids may be maintained at constant temperatures by using a refrigeration system 150A to cool the cold heat transfer fluid stored in a cold heat transfer fluid tank and use the reject heat to heat the hot heat transfer fluid stored in a hot heat transfer fluid tank. The refrigeration system includes a hot water circulation pump 138, a hot water tank 140, a condenser 142, a compressor 144, a cold water tank 146, and a cold water circulation pump 148. The system 400 further includes an expansion valve 150. The hot heat transfer fluids could be used to evaporate water or liquid mixture in the evaporation vessel and cold heat transfer fluid could be used to condense equi-molar amount of water or liquid mixture in the condensation vessel 104. The amount of heat rejected in the condenser 142 of the refrigeration system is around 1.5 times the heat absorbed in the evaporator of a refrigeration system. In the embodiment, the evaporation vessel 102 is using the rejected heat and condensation vessel 104 is giving heat to the refrigeration system. As the system 400 is insulated resulting in very less heat exchange with the surroundings so enough heat is always available in the evaporation vessel 102 to evaporate a given quantity of water or liquid mixture by condensing equi-molar quantity of water or liquid mixture in the condensation vessel 104. An air cooled or water cooled condenser 142 is configured after the hot heat transfer fluid tank to reject the waste heat remaining after heating the hot heat transfer fluid tank. The above described embodiment is shown in FIG. 4.

Figure 5:
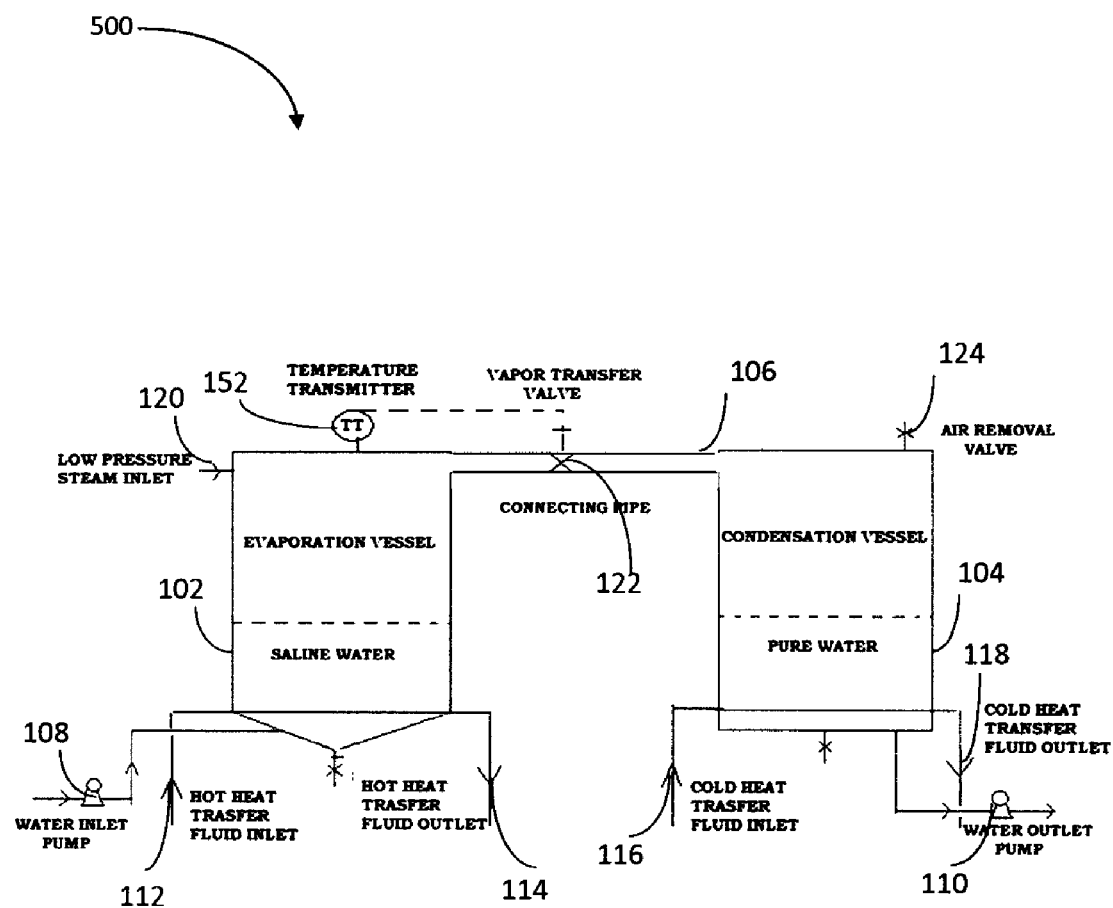
FIG. 5 shows a schematic view of a distillation system in accordance with an embodiment of the invention.

Referring to FIG. 5, another embodiment in accordance with the invention is illustrated. The elevation in boiling point with increased salinity is different for different salt solutions. For some salt solutions, the elevation in boiling point with increased salinity is very high. For such salt solutions, it is not possible to maintain reasonably high molar rate of production, transfer and condensation of water vapours with increasing salinity. Also constant high molar rate of production, transfer and condensation of water vapours with increasing salinity may be desirable in continuous operation of the invention where level of liquid in evaporation vessel 102 and condensation vessel may required to be maintained. In order to maintain constant high molar rate of water vapours produced, transferred and condensed with increasing salinity, the temperature of evaporation vessel is maintained at a constant value by increasing the opening of the connecting pipe 106 as desalination process continues using vapour transfer valve 122 placed in the connecting pipe 106. When opening of connecting pipe 106 is not varied with increasing salinity, it results in decreased pressure and increased temperature in evaporation vessel 102 and a lower molar rate of production, transfer and condensation of water vapours.

The increased opening of the connecting pipe 106 results in increased molar flow rate of water vapours from evaporation vessel 102 to condensation vessel 104 which results in further decrease in pressure in evaporation vessel 102. This also results in decrease in temperature evaporation vessel 102. A suitable increased opening of the connecting pipe 106 with increasing salinity maintains constant temperature in the evaporation vessel 102 transmitted using a temperature transmitter 152 which with unchanged flow rate of hot heat transfer liquid results in same molar rate of evaporation of water in evaporation vessel 102 with increased salinity as per equation 1.

As the equilibrium state is maintained for any salinity of water in evaporation vessel 102 so same molar rate of transfer of water vapours from evaporation vessel 102 to condensation vessel 104 and same molar rate of condensation of water in condensation vessel 104 is maintained with increasing salinity by increasing the area of opening of connecting pipe 106 to maintain constant temperature in evaporation vessel 106. This also results of decreased pressure in evaporation vessel 106 and constant temperature and pressure of condensation vessel 104. Therefore, a suitable increased area of opening of connecting pipe 106 to maintain constant temperature in evaporation vessel 102 offsets the effect of decreased difference in pressure of evaporation vessel 102 and condensation vessel 104 to maintain constant flow rate of water vapours from evaporation vessel 102 to condensation vessel 104 and constant evaporation and condensation rates.

A constant flow rate of water vapours from evaporation vessel 102 to condensation vessel 104 and constant evaporation and condensation rates results by maintaining constant temperature in condensation vessel 104 by increasing the opening of the connecting pipe 106, by maintaining constant pressure in evaporation vessel 102 by increasing the flow rate or inlet temperature of hot heat transfer fluid in evaporation vessel 102 or by maintaining constant condensation rate in condensation vessel 104 by increasing the flow rate or decreasing the inlet temperature of cold heat transfer fluid in condensation vessel 104. As described earlier, any variation in either of evaporation rate, condensation rate or rate of transfer of water vapours would result in automatic adjustment in temperature and pressure of evaporation vessel 102 and condensation vessel 104 so that the evaporation rate, condensation rate and rate of transfer of water vapours at any given time is the same. For separation of liquid mixture using the invention, similar to water desalination using the invention, an increased opening of the connecting pipe 106 will result in increased molar rate of evaporation, transfer and condensation of liquid mixture vapours. The system 500 for water desalination in accordance with this embodiment is shown in FIG. 5.

Figure 6:
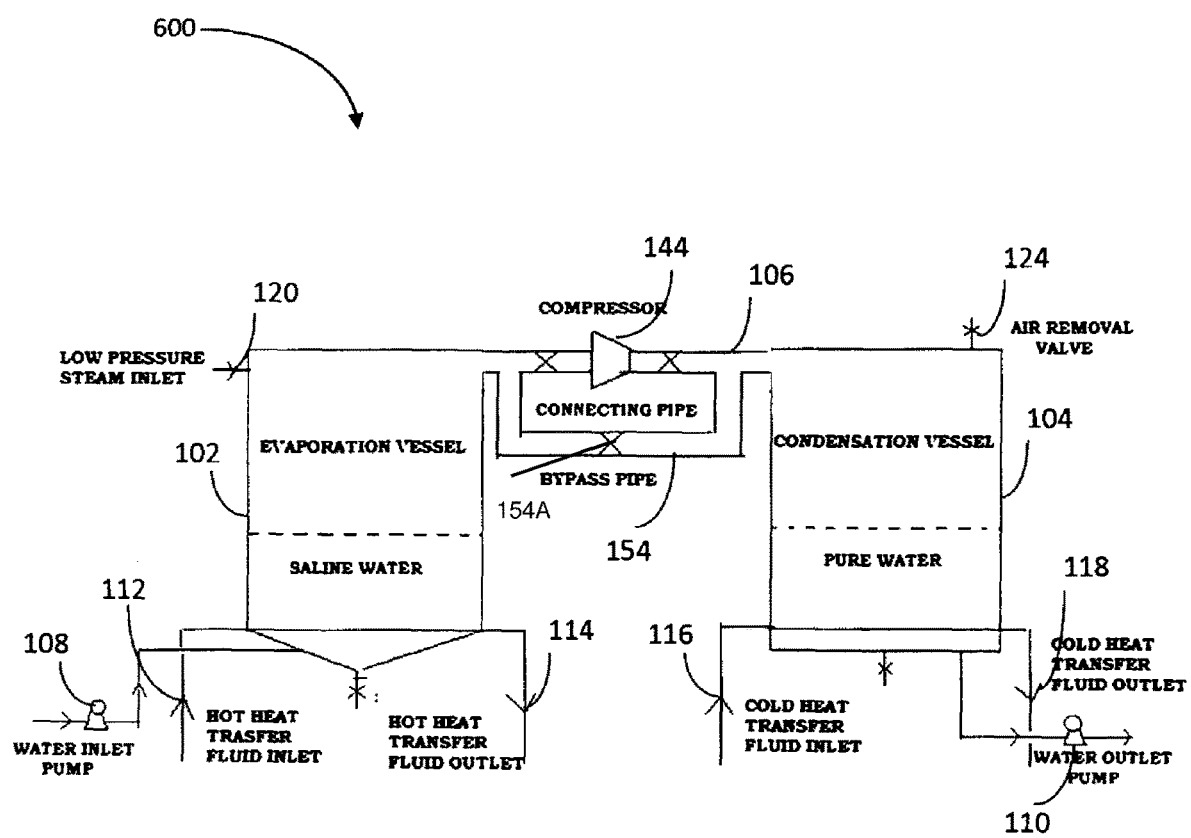
FIG. 6 shows a schematic view of a distillation system in accordance with an embodiment of the invention.

Referring to FIG. 6, another embodiment in accordance with the invention is illustrated. In system 600, a compressor or fan 144 can be placed in the connecting pipe 106 to increase the molar rate of transfer of water vapours from evaporation vessel 102 to condensation vessel 104, decrease the pressure of the evaporation vessel 102 and increase the pressure of the condensation vessel 104. A bypass pipe 154 with bypass valve 154A to the compressor 144 is provided to depressurize and pressurize the complete system 600 during start and end of the desalination process. A demister could be placed in the evaporation vessel to prevent entrainment of saline water with water vapours in the compressor to avoid damage to compressor.

The operation of compressor 144 is to increase the rate of transfer of water vapours from evaporation vessel 102 to condensation vessel 104 results in decreased pressure in the evaporation vessel 102 and increased pressure in the condensation vessel 104. This will result in decrease in temperature of evaporation vessel 102 and increase in temperature of condensation vessel 104 such that the temperature and pressure of condensation vessel 104 exceeds the temperature and pressure of evaporation vessel. This will result in a higher rate of evaporation of water vapours in evaporation vessel 102 due to increased difference in inlet and outlet temperature of hot heat transfer liquid for unchanged flow rate of heat transfer liquid and a higher rate of condensation of water vapours in condensation vessel 104 due to increased difference between inlet and outlet temperature of cold heat transfer liquid for unchanged flow rate of cold heat transfer liquid as per equation 1. As the mass flow rate of a compressor is inversely proportional to its pressure ratio (discharge pressure/suction pressure) so operation of a compressor in the connecting pipe 106 between evaporation vessel 102 and condensation vessel 104 results in an increased rate of transfer of water vapours from evaporation vessel 102 to condensation vessel 104 and an automatic adjustment in the pressure and temperature of evaporation vessel 102 and condensation vessel 104 such that water vapours are produced, transferred and condensed at the same rate.

Optionally, the system 600 can be made more operationally flexible by configuring a vapour transfer valve in the bypass pipe 154. In such a case, the system 600 could also be operated for low evaporation and condensation rate requiring lesser energy by isolating the compressor or fan 144 configured in the connecting pipe 106 and using the bypass pipe 154 and vapour transfer valve to transfer vapours from evaporation vessel 102 to condensation vessel 104. This vapour transfer valve could be closed completely when compressor 154 is used to transfer the vapours from evaporation vessel 102 to condensation vessel 104. A similar operation of the invention is observed when the invention is used to separate liquid mixtures. The embodiment for water desalination using the above embodiment is shown in FIG. 6.

Figure 7:
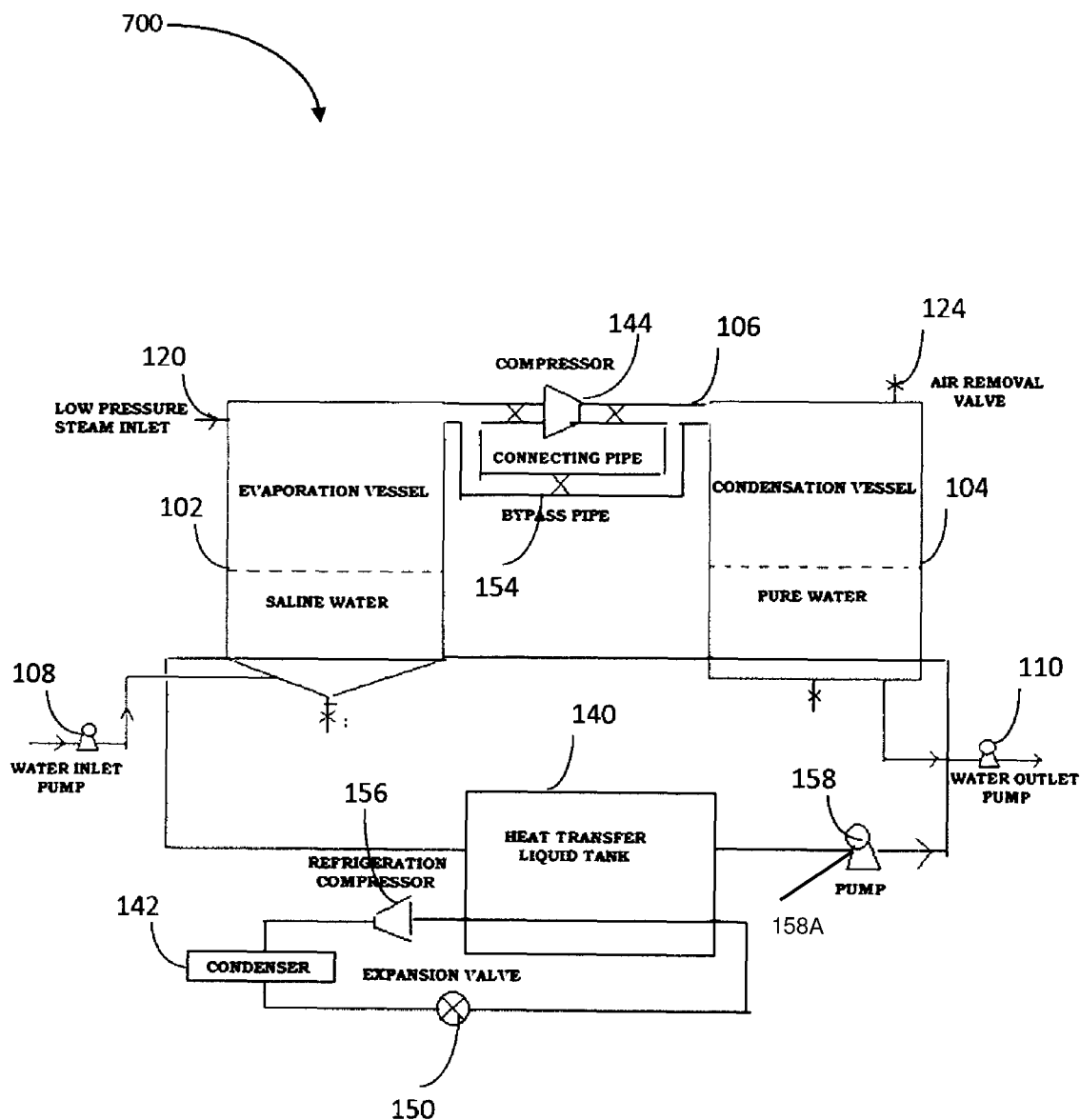
FIG. 7 shows a schematic view of a distillation system in accordance with an embodiment of the invention.

Referring to FIG. 7, another embodiment in accordance with the invention is illustrated. In system 700, as the compressor 144 is configured in the connecting pipe 106, the pressure in of condensation vessel 104 is more than the pressure of evaporation vessel 102. For a required rate of production, transfer and condensation of water vapours and for a suitably high capacity of compressor 144 configured in the connecting pipe 106, the temperature and pressure of condensation vessel 104 exceeds that of evaporation vessel 102 and the same circulating heat transfer fluid can initially cools the condensation vessel 104 and gets heated in the process and then heats the evaporation vessel 102 and gets cooled in the process to give the required rates of production, transfer and condensation of water vapours. The heat transfer fluid used can be stored at ambient temperature in a single tank at the start of the process. As the desalination process continues in the above described system, the salinity of water remaining in evaporation vessel 102 keeps on increasing. This results in increase in temperature of evaporation vessel 102 and condensation vessel 104 and decreased rate of production, transfer and condensation of water vapours.

After the desalination process is completed, a low capacity refrigeration system comprising a refrigeration compressor 156, a water cooled or air cooled condenser 142 and an expansion valve 150 can be used to decrease the temperature of heat transfer fluid stored in the heat transfer fluid storage tank 140 to a desired value. Water at ambient temperature could be used as the heat transfer fluid stored in the heat transfer fluid storage tank 140. In case the temperature rise of the heat transfer fluid tank storing heat transfer fluid at ambient temperature after the desalination process is small then the heat transfer fluid tank could be left un-insulated and the use of low capacity refrigeration system for cooling the heat transfer fluid tank could be avoided with pump 158 as a circulation means 158A. A similar operation of the invention is observed when the invention is used to separate liquid mixtures. The embodiment for water desalination using the above embodiment of the invention is shown in FIG. 7.

Figure 8:
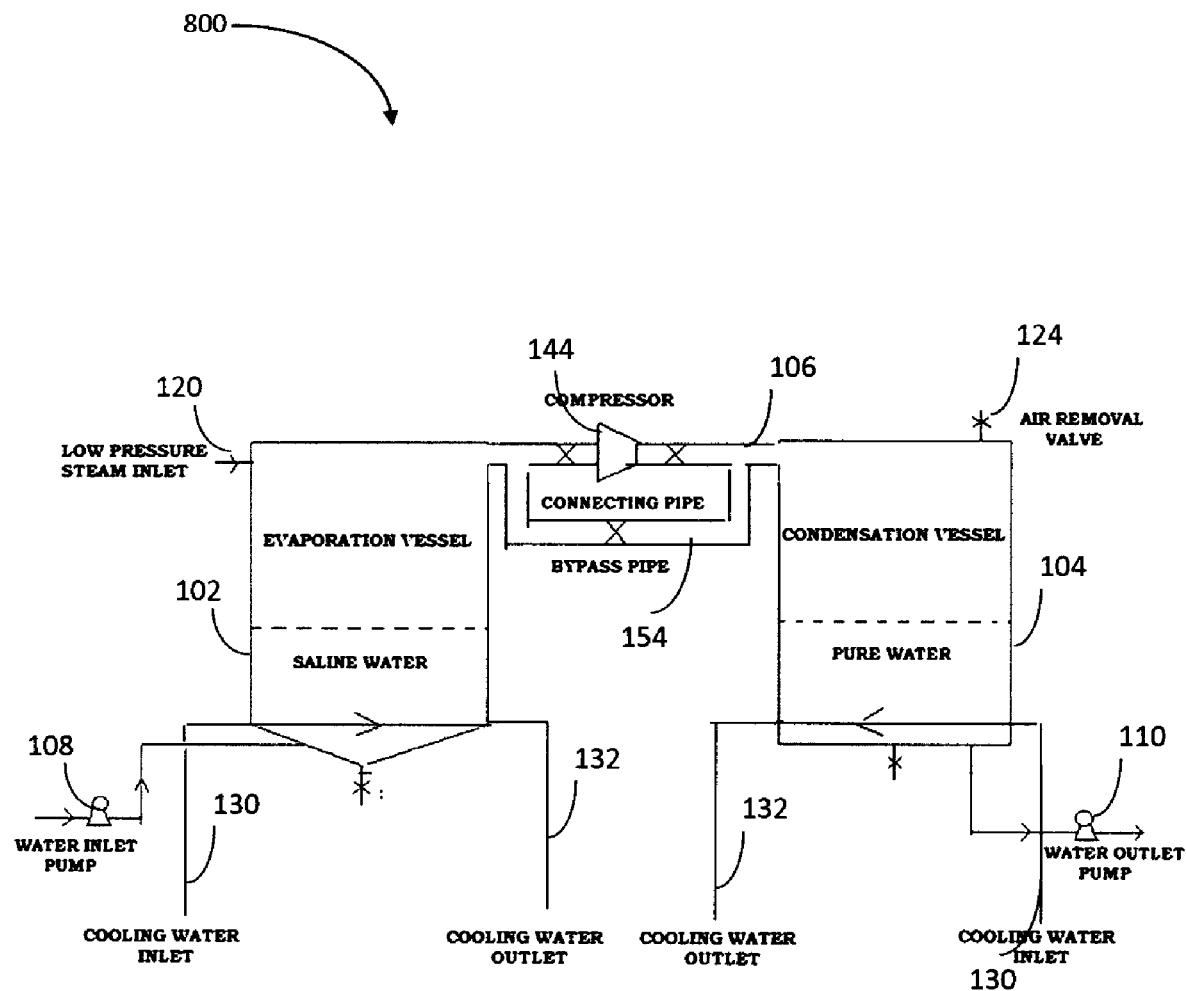
FIG. 8 shows a schematic view of a distillation system in accordance with an embodiment of the invention.

Referring to FIG. 8, another embodiment in accordance with the invention is illustrated. In case of system 800, the facilities of a cooling tower are available for the desalination process then water can be used as heat transfer liquid and instead of storing water at ambient temperature in a heat transfer liquid tank, water can directly be taken from cooling tower, circulated initially through either of the vessel and then through the other vessel and sent back to the cooling tower at elevated temperature. Also, instead of circulating cooling water through both the vessel in sequence, cooling water can be used separately in each of the vessel to heat the evaporation vessel and getting cooled and cool the condensation vessel and getting heated. The outlet water from both the vessels is sent to the cooling tower. A similar operation of the invention is observed when the invention is used to separate liquid mixtures. The embodiment for water desalination in accordance with this embodiment is shown in FIG. 8.

During system start-up, both the evaporation vessel 102 and condensation vessel 104 are completely filled with saline water through a water inlet pump connected to evaporation vessel 102 with air or any vapours present in the system being flushed out through an air removal valve provided on top of condensation vessel 104. After filling both the vessels with saline water, the air removal valve 124 is closed. A water outlet pump 110 is connected to the condensation vessel 104 to take out water from the condensation vessel 104. The water outlet pump 110 is designed to work at negative gauge suction pressure. The water outlet pump 110 suction is kept at a lower elevation than the bottom of condensation vessel 104 so as to always provide the pump with required NPSH to avoid cavitation of pump 110. Both the water inlet pump 108 and the water outlet pump 110, the associated valves, other pump ancillaries and the air removal valve 124 are kept air tight to avoid any air to enter the distillation system. The water outlet pump 110 is operated to pump water completely out of condensation vessel 104. At this point, evaporation vessel 102 is completely filled with water whereas condensation vessel 104 only contains water vapours and the pressure of the system is equal to the vapour-liquid equilibrium pressure of water corresponding to the temperature of the system.

Alternatively, low pressure steam is injected into the empty system and mixture of steam and air is taken out of air removal valve 124 till the concentration of air in the air-steam mixture becomes very low. Subsequently air removal valve 124 is closed to make the system air-tight and suitable quantity of water to be desalinated is pumped into the evaporation vessel 102 through water inlet pump 108. Else, water to be desalinated is pumped into the evaporation vessel 102 with air removal valve 124 kept open and heated to a temperature higher than its boiling temperature to produce steam which will flush out air from both the vessels.

An electric heater, a gas fired heater, a solar heater or hot heat transfer fluid at a temperature higher than boiling point of saline water can be used to heat the saline water inside the evaporation vessel 102 to produce steam. The concentration of air in air-steam mixture coming out of air removal valve 124 is monitored and air removal valve 124 is closed to make the system air-tight when concentration of air in air-steam mixture becomes very low. After this, for any of the alternatives described above, the temperature of condensation vessel 104 and evaporation vessel 102 is reduced to the temperature of cold heat transfer fluid inlet by circulating cold heat transfer fluid through either of the vessels or both of the vessels with vapour transfer valve kept open.

For effective and efficient operation of the invention, the temperature of evaporation vessel 102 and condensation vessel 104 should be fixed such that the pressure difference between the two vessels does not result in choked flow. However, the invention will operate similarly during choked flow as it would when the flow is not choked. During choked flow, an increase in pressure difference between evaporation vessel 102 and condensation vessel 104 will not result in increase in flow rate of water vapours through the connecting pipe 106. During choked flow, the temperature of evaporation vessel 102, the outlet temperature of hot heat transfer fluid from evaporation vessel 102 coil, the temperature of condensation vessel 104 and the outlet temperature of cold heat transfer fluid from condensation vessel 104 coil automatically get adjusted so as to evaporate and condense water at a rate equal to choked flow rate through the connecting pipe 106. Choked flow rate at a fully opened vapour transfer valve 111 gives the maximum possible rate of evaporation and condensation for the invention. A lower difference of temperature between hot heat transfer fluid inlet temperature and evaporation vessel 102, between evaporation vessel 102 and condensation vessel 104 and between condensation vessel 104 and cold heat transfer fluid inlet temperature is preferred as it would require lower energy to maintain these temperatures.

Figure 9:
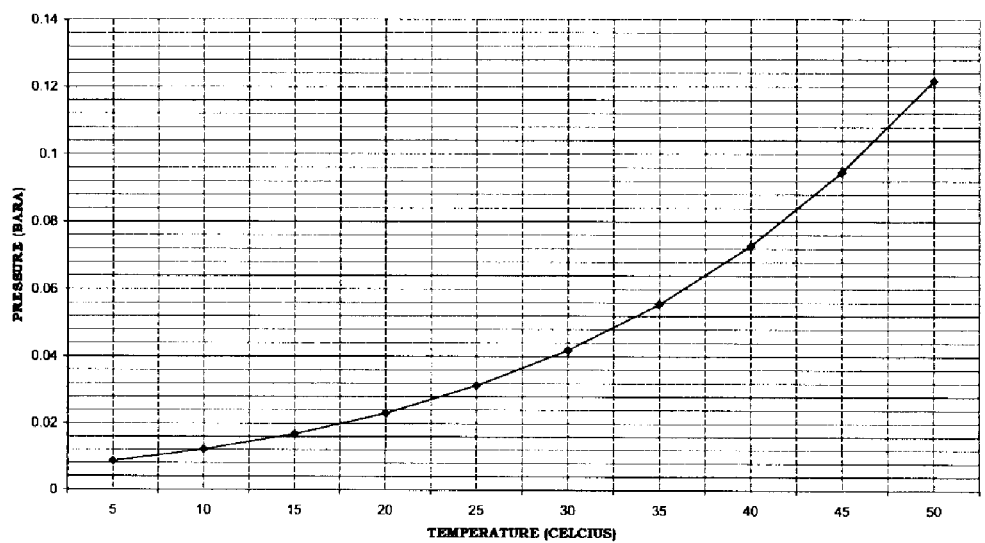
FIG. 9 is a graph illustration of a vapour-liquid equilibrium pressure and temperature values for pure water as given in table 1 and vapour pressure curve for pure water.

Also, as the pressure of evaporation vessel 102 decreases while that of condensation vessel 104 increases as the desalination process proceeds so the difference in temperatures of evaporation vessel 102 and condensation vessel 104 at the start of the desalination process should not be so low that the pressure of evaporation vessel 102 becomes equal to pressure of condensation vessel 104 during the desalination process before the desired salinity reduction is attained resulting in stoppage of desalination process. The vapour-liquid equilibrium pressure and temperature values for pure water are given in table 1 and vapour pressure curve for pure water is illustrated in FIG. 9.

Now cold heat transfer fluid is circulated through condensation vessel 104 at maximum flow rate and hot heat transfer fluid is circulated through evaporation vessel 102 at increasing flow rate. This results in increase in temperature of both evaporation vessel 102 and condensation vessel 104 from the minimum set temperature of the invention. The increasing flow rate of hot heat transfer fluid through evaporation vessel 102 results in increasing steady state temperatures of evaporation vessel 102 and condensation vessel 104 which results in increasing evaporation and condensation rates in evaporation vessel 102 and condensation vessel 104 respectively.

Also, this results in increasing difference between the steady state temperatures of evaporation vessel 102 and condensation vessel 104 resulting in increased pressure differential between evaporation vessel 102 and condensation vessel 104 and increased molar rate of transfer of water vapours from evaporation vessel 102 and condensation vessel 104. At any given flow rate of hot heat transfer liquid through evaporation vessel 102, an equilibrium state is achieved resulting in equal molar rate of evaporation of water in evaporation vessel 102 producing water vapours, equal molar rate of transfer of water vapours from evaporation vessel 102 to condensation vessel 104 and equal molar rate of condensation of water vapours in condensation vessel 104 to produce desalinated water. The flow rate of hot heat transfer liquid is increased till its maximum value.

An increased opening of connecting pipe 1 6 always results in increased rate of evaporation and condensation for all applications of the invention. This happens as an increase in area of opening of connecting pipe 106 results in a decrease in pressure and equilibrium temperature of evaporation vessel 102 and an increase in pressure and equilibrium temperature of condensation vessel 104 for same salinity of water remaining in the evaporation vessel 102. A decrease in temperature of evaporation vessel 102 implies a lower outlet temperature of hot heat transfer fluid whereas an increase in temperature of condensation vessel 104 implies a higher outlet temperature of cold heat transfer fluid resulting in higher evaporation and condensation rates as per equation 1.

However, this increase in rate of evaporation and condensation lowers with increase in area of opening of connecting pipe 106. Also, a larger opening of connecting pipe 106 requires a connecting pipe of larger area and a bigger vapour transfer valve 122 resulting in increase in capital cost of the invention. Therefore, the size of connecting pipe 106 for the invention is decided such that the increase in cost of connecting pipe 106 and vapour transfer valve 122 is compensated by the energy saved by increased rate of evaporation and condensation for same flow rate and inlet temperature of hot and cold heat transfer fluids. Therefore, the opening of connecting pipe 106 is adjusted to its maximum value by fully opening the vapour transfer valve 122 to get the maximum possible evaporation and condensation rate.

As the water in the evaporation vessel 102 vaporizes, the salinity of the remaining saline water in the evaporation vessel 102 increases. This results in elevation in boiling point of remaining saline water in the evaporation vessel 102. This variation results in automatic adjustment of temperatures of evaporation vessel 102 and condensation vessel 104 resulting in lower rates of evaporation and condensation of water.

Otherwise alternate heating of evaporation vessel 102 and cooling of condensation vessel 104 by alternate flow of hot heat transfer fluid in the evaporation vessel heat transfer coil and of cold heat transfer fluid in condensation vessel heat transfer coil is carried out. Initially evaporation vessel 102 at an initial pressure is heated resulting in evaporation of water and transfer of some vapours in condensation vessel 104 through connecting pipe 106. This results in increase in pressure of both evaporation vessel 102 and condensation vessel 104. Now heating of evaporation vessel 102 is stopped and cooling of condensation vessel 104 is carried out. This results in condensation of some vapours in condensation vessel 104 and decrease in pressure of both evaporation vessel 102 and condensation vessel 104. Cooling of condensation vessel 104 is stopped when the pressure of evaporation vessel 102 and condensation vessel 104 lowers to the desired value and again the heating and cooling cycle is repeated till the desired amount of water is desalinated.

A compressor or fan can be configured in the connecting pipe 106 to increase the molar rate of evaporation and condensation of water. In case the invention is operated with a compressor or fan configured in the connecting pipe 106 and the heating rate of evaporation vessel 102 and cooling rate of condensation vessel 104 is low then pressure of condensation vessel 104 increases and pressure of evaporation vessel 102 decreases such that after some time the pressure ratio (=discharge pressure/suction pressure) exceeds its maximum allowed value for the compressor or fan resulting in damage to compressor or fan. In such a case, the compressor or fan is operated till the maximum allowed pressure ratio for compressor or fan is reached and then stopped. The heating of evaporation vessel 102 and cooling of condensation vessel 104 is continued without operating the compressor or fan for some time. This results in increase in pressure of evaporation vessel 102 and decrease in pressure of condensation vessel 104 and an overall decrease in pressure ratio. When the pressure ratio decreases below a suitable value, the compressor or fan is started again to transfer the vapours from evaporation vessel 102 to condensation vessel 104 till the maximum allowed pressure ratio of compressor or fan is reached and then stopped again. This intermittent operation of compressor or fan results in effective working of the invention for low heating and cooling rates of evaporation vessel 102 and condensation vessel 104. Also for effective working of the invention with a compressor or fan operating in the connecting pipe 106 and low heating and cooling rates of evaporation vessel 102 and condensation vessel 104, the bypass pipe is opened partially to recycle some vapours back to the evaporation vessel 102 from condensation vessel 104 decreasing the effective rate of transfer of vapours from evaporation vessel 102 to condensation vessel 104. A suitable opening of the bypass pipe keeps the pressure ratio below the maximum allowed value for the compressor or fan always resulting in continuous and safe operation of the compressor or fan.

Though the invention can be operated with alternate heating of evaporation vessel 102 and cooling of condensation vessel 104 and with intermittent operation of compressor or fan in case compressor or fan is configured in the connecting pipe 106, but these operations are not the best optimized ones in terms of energy and time required for desalination. A continuous heating of evaporation vessel 102 and cooling of condensation vessel 104 with suitably large opening of connecting pipe 106 and a continuously operating compressor or fan with no recycle through the bypass pipe in case compressor is configured in the connecting pipe 106 result in most optimized operation of invention in terms of energy and time required for desalination.

Pure water is pumped out of the condensation vessel 104 when all the saline water is vaporized from the evaporation vessel 102 and condensed in condensation vessel 104, the system is opened to the atmosphere and salt is removed from the evaporation vessel 102. In case salt crystallization is not desired then pure water is pumped out of condensation vessel 104 when water of desired salinity remains in the evaporation vessel 102. After this, the system is opened to atmosphere and concentrated saline water is collected from evaporation vessel 102.

The requirement of pumping pure water out of condensation vessel 104 can be avoided in case the system is pressurised with low pressure steam and pure water from condensation vessel 104 and concentrated saline and/or salt is taken out by opening the bottom valves in the respective vessels to atmosphere.

Figure 10:
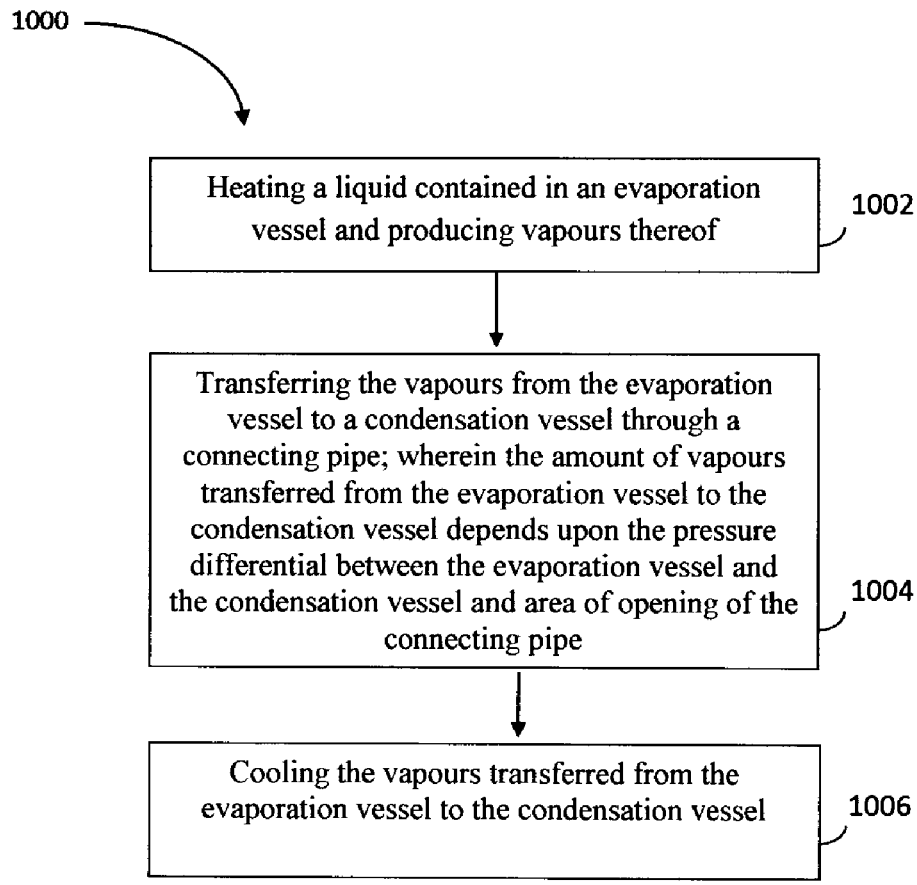
FIG. 10 shows a schematic view of a distillation process in accordance with an embodiment of the invention.

Referring to FIG. 10, a distillation method/process in accordance with an embodiment of the invention is provided. The method 1000 includes step 1002 of heating a liquid contained in an evaporation vessel and step 1004 of producing vapours thereof and transferring the vapours from the evaporation vessel to a condensation vessel through a connecting pipe; wherein the amount of vapours transferred from the evaporation vessel to the condensation vessel depends upon the pressure differential between the evaporation vessel and the condensation vessel and area of opening of the connecting pipe. The method 1000 further includes step 1006 cooling/condensing the vapours transferred from the evaporation vessel to the condensation vessel.

The advantages of the present invention are its low capital as well as operating cost and simplicity and ease of installation. The present invention just comprises of two vessels and a heating and cooling fluid for crystallization of salt resulting in very low capital cost compared to competing technologies like multi-effect distillation which is only suitable for sea water desalination and mechanical vapour compression which cannot crystallize salt viably. Also, the invention can be used wherever either of the heating or cooling fluid is available. In such a case, water at ambient temperature is used as cooling or heating fluid to desalinate water. Also, the difference in outlet temperatures of hot heat transfer fluid and cold heat transfer fluid can further be used to desalinate more water till the temperature difference becomes unsuitable for any further desalination.

The present invention can be operated in continuous mode apart from batch mode as described above. In continuous mode operation for water desalination, inlet and outlet pumps are operated continuously so as to maintain the level of water in evaporation vessel 102 and condensation vessel 104. As the desalination process continues, the salinity of water in evaporation vessel 102 keeps on increasing till eutectic composition is reached. Beyond this point, salt starts crystallizing and starts collecting in the evaporation vessel 102. The invention is operated continuously until a sufficient amount of salt is collected in the evaporation vessel 102. After this, the desalination process is stopped by stopping the pumps, salt is removed from the evaporation vessel 102 and the desalination process is restarted by restarting the pumps.

Similar methods are adopted for separation of liquid mixtures in continuous mode operation of the invention.

Apart from reducing dissolved solids in water, the invention can also be used for reducing dissolved solids in other liquids. Also, the invention can be used for reducing suspended solids and miscible liquids in water or other liquids like hydrocarbons. The invention can be operated in a similar manner for separation of hydrocarbon mixtures by using suitable heating and cooling fluids with suitable temperatures and flow rates and/or a compressor of suitable rating in the connecting pipe 106. Also, the invention can be operated in continuous mode as described earlier for heating of re-boiler and cooling of condenser of vertical or horizontal distillation columns used for separation of hydrocarbon mixtures using distillation unit operation in refineries and other chemical plants.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any components, that may cause any benefit, advantage, or solution to occur or become more pronounced are not to be construed as a critical, required, or essential feature or component of any or all the claims.

I claim:

1. A method, comprising the steps of:
    assembling a system being comprised of:
        an evaporation vessel having means for heating a liquid contained in said evaporation vessel;
        a water inlet pump in fluid connection with said evaporation vessel;
        a condensation vessel having means for cooling and condensing said vapors;
        a water outlet pump in fluid connection with said condensation vessel;
        an air removal valve in fluid connection with said condensation vessel; and
        a connecting pipe in fluid connection with said evaporation vessel and said condensation vessel, said connecting pipe having an opening with an area and a rate of vapor transfer, said evaporation vessel and said condensation vessel being connected through said connecting pipe at a pressure differential set by said area of said opening and said rate of vapor transfer;
    setting an initial pressure configuration of said evaporation vessel relative to said condensation vessel with a liquid in said evaporation vessel;
    heating said liquid contained in said evaporation vessel so as to produce vapors;
    setting said area of said opening, according to said rate of vapor transfer so as to transfer said vapors from said evaporation vessel to said condensation vessel through said connecting pipe as transferred vapors;

cooling said transferred vapors in said condensation vessel so as to form a distilled liquid; and collecting said distilled liquid from said condensation vessel by said water outlet pump, wherein the step of setting an initial pressure configuration of said evaporation vessel relative to said condensation vessel with a liquid in said evaporation vessel comprises the steps of:

filling said evaporation vessel and said condensation vessel by said water inlet pump with said liquid so as to remove non-condensable gases from said system through said air removal valve;

closing said air removal valve;

removing said liquid from said condensation vessel by said water outlet pump so as to form space within a top end of said condensation vessel, said space being filled with evaporated vapor from said liquid in said condensation vessel and said evaporation vessel; and reaching vapor liquid equilibrium pressure of said liquid corresponding to temperature within said system so as to set said initial pressure configuration of said evaporation vessel relative to said condensation vessel.

2. The method as claimed in claim 1, wherein said differential pressure is further set by a temperature of said evaporation vessel and a temperature of said condensation vessel.

3. The method as claimed in claim 1, wherein said system further comprises: means for heating a liquid contained in said evaporation vessel being comprised of coils, having a coil flow rate and a coil temperature, in heat transfer relationship to said evaporation vessel so as to set a rate of liquid evaporated from said evaporation vessel, and wherein said means for cooling and condensing said vapors is comprised of coils, having another coil flow rate and another coil temperature, in heat transfer relationship to said condensation vessel so as to set a rate of vapor condensed in said condensation vessel.

4. The method as claimed in claim 1, wherein said system further comprises:

means for heating a liquid contained in said evaporation vessel so as to produce vapors being comprised of a hot heat transfer fluid inlet in heat transfer relationship to said evaporation vessel so as to heat said evaporation vessel to a first temperature, and a hot heat transfer fluid outlet in fluid connection with said hot heat transfer fluid inlet;

means for cooling and condensing said vapors being comprises of a cold heat transfer fluid inlet in heat transfer relationship to said condensation vessel so as to cool said condensation vessel to a second temperature, and a cold heat transfer outlet in fluid connection with said cold heat transfer fluid inlet, said first temperature being higher than said second temperature, and wherein said connecting pipe is further comprised of:

a compressor being placed in said connecting pipe so as to increase a molar rate of transfer of vapors from said evaporation vessel to said condensation vessel, decrease pressure in said evaporation vessel and increase pressure in said condensation vessel;

a bypass pipe with bypass valve in fluid connection with said evaporation vessel and said condensation vessel in parallel to said connecting pipe with said compressor, said bypass pipe having said opening with said area; and a heat transfer liquid in said hot heat transfer fluid inlet.

5. The method as claimed in claim 4, the method further comprising the step of:

losing heat by said heat transfer liquid as a function of mass flow rate of said heat transfer fluid in heat transfer relationship to said evaporation vessel, specific heat of said heat transfer fluid in heat transfer relationship to said evaporation vessel and difference in an inlet temperature at said hot heat transfer fluid inlet and an outlet temperature of said hot heat transfer fluid outlet.

6. The method as claimed in claim 4, wherein said hot heat transfer fluid outlet is in fluid connection with said cold heat transfer fluid inlet.

7. The method as claimed in claim 1, wherein a molar rate of evaporation of said liquid in said evaporation vessel is directly proportional to said area of said opening of said connecting pipe, a flow rate from said hot heat transfer fluid inlet to said hot heat transfer fluid outlet, a temperature at said hot heat transfer fluid inlet, a temperature at said hot heat transfer fluid outlet, a flow rate from said cold heat transfer fluid inlet to said cold heat transfer fluid outlet, a temperature at said cold heat transfer fluid inlet, a temperature at said cold heat transfer fluid outlet, wherein said rate of vapor transfer is directly proportional to said area of said opening of said connecting pipe, a flow rate from said hot heat transfer fluid inlet to said hot heat transfer fluid outlet, a temperature at said hot heat transfer fluid inlet, a temperature at said hot heat transfer fluid outlet, a flow rate from said cold heat transfer fluid inlet to said cold heat transfer fluid outlet, a temperature at said cold heat transfer fluid inlet, a temperature at said cold heat transfer fluid outlet, and wherein a rate of condensation in said condensation vessel is directly proportional to said area of said opening of said connecting pipe, a flow rate from said hot heat transfer fluid inlet to said hot heat transfer fluid outlet, a temperature at said hot heat transfer fluid inlet, a temperature at said hot heat transfer fluid outlet, a flow rate from said cold heat transfer fluid inlet to said cold heat transfer fluid outlet, a temperature at said cold heat transfer fluid inlet, a temperature at said cold heat transfer fluid outlet.

8. The method, according to claim 1, wherein the step of setting said area of said opening, according to said rate of vapor transfer so as to transfer said vapors from said evaporation vessel to said condensation vessel through said connecting pipe further comprises the steps of:

fixing said area of said opening;

maintaining pressure of said evaporation vessel by temperature variation in said evaporation vessel so as to keep said pressure differential constant, said rate of vapor transfer being constant, said rate of evaporation being constant, said rate of condensation being constant.

9. The method, according to claim 1, wherein the step of setting said area of said opening, according to said rate of vapor transfer so as to transfer said vapors from said evaporation vessel to said condensation vessel through said connecting pipe further comprises the steps of:

fixing said area of said opening;

maintaining said rate of condensation by temperature variation in said condensation vessel so as to keep said rate of vapor transfer constant, said rate of evaporation being constant.

10. The method as claimed in claim 1, further comprising the step of:
alternately stopping and starting the step of heating said liquid contained in said evaporation vessel and the step of cooling said transferred vapors in said condensation vessel.

11. A method, comprising the steps of:
assembling a system being comprised of:
an evaporation vessel having means for heating a liquid contained in said evaporation vessel;
a water inlet pump in fluid connection with said evaporation vessel;
a condensation vessel having means for cooling and condensing said vapors;
a water outlet pump in fluid connection with said condensation vessel;
an air removal valve in fluid connection with said condensation vessel; and
a connecting pipe in fluid connection with said evaporation vessel and said condensation vessel, said connecting pipe having an opening with an area and a rate of vapor transfer, said evaporation vessel and said condensation vessel being connected through said connecting pipe at a pressure differential set by said area of said opening and said rate of vapor transfer;
setting an initial pressure configuration of said evaporation vessel relative to said condensation vessel with a liquid in said evaporation vessel;
heating said liquid contained in said evaporation vessel so as to produce vapors;
setting said area of said opening, according to said rate of vapor transfer so as to transfer said vapors from said evaporation vessel to said condensation vessel through said connecting pipe as transferred vapors;
cooling said transferred vapors in said condensation vessel so as to form a distilled liquid; and
collecting said distilled liquid from said condensation vessel by said water outlet pump,
wherein the step of setting an initial pressure configuration of said evaporation vessel relative to said condensation vessel with a liquid in said evaporation vessel comprises the steps of:
filling said evaporation vessel, said connecting pipe, and said condensation vessel with steam below atmospheric pressure;
pressurizing said evaporation vessel and said condensation vessel to above atmospheric pressure so as to remove pure water from said condensation vessel, so as to remove crystallized salt or concentrated liquid from said evaporation vessel, and so as to remove non-condensable gases from said evaporation vessel and said condensation vessel;
filling said evaporation vessel by said water inlet pump with said liquid so as to set said initial pressure configuration of said evaporation vessel relative to said condensation vessel.

12. The method as claimed in claim 11, wherein said differential pressure is further set by a temperature of said evaporation vessel and a temperature of said condensation vessel.

13. The method as claimed in claim 11, wherein said system further comprises: means for heating a liquid contained in said evaporation vessel being comprised of coils, having a coil flow rate and a coil temperature, in heat transfer relationship to said evaporation vessel so as to set a rate of liquid evaporated from said evaporation vessel, and wherein said means for cooling and condensing said vapors is comprised of coils, having another coil flow rate and another coil temperature, in heat transfer relationship to said condensation vessel so as to set a rate of vapor condensed in said condensation vessel.

14. The method as claimed in claim 11, wherein said system further comprises:
means for heating a liquid contained in said evaporation vessel so as to produce vapors being comprised of a hot heat transfer fluid inlet in heat transfer relationship to said evaporation vessel so as to heat said evaporation vessel to a first temperature, and a hot heat transfer fluid outlet in fluid connection with said hot heat transfer fluid inlet;
means for cooling and condensing said vapors being comprises of a cold heat transfer fluid inlet in heat transfer relationship to said condensation vessel so as to cool said condensation vessel to a second temperature, and a cold heat transfer outlet in fluid connection with said cold heat transfer fluid inlet, said first temperature being higher than said second temperature, and
wherein said connecting pipe is further comprised of:
a compressor being placed in said connecting pipe so as to increase a molar rate of transfer of vapors from said evaporation vessel to said condensation vessel, decrease pressure in said evaporation vessel and increase pressure in said condensation vessel;
a bypass pipe with bypass valve in fluid connection with said evaporation vessel and said condensation vessel in parallel to said connecting pipe with said compressor, said bypass pipe having said opening with said area; and
a heat transfer liquid in said hot heat transfer fluid inlet.

15. The method as claimed in claim 14, the method further comprising the step of:
losing heat by said heat transfer liquid as a function of mass flow rate of said heat transfer fluid in heat transfer relationship to said evaporation vessel, specific heat of said heat transfer fluid in heat transfer relationship to said evaporation vessel and difference in an inlet temperature at said hot heat transfer fluid inlet and an outlet temperature of said hot heat transfer fluid outlet.

16. The method as claimed in claim 14, wherein said hot heat transfer fluid outlet is in fluid connection with said cold heat transfer fluid inlet.

17. The method as claimed in claim 11,
wherein a molar rate of evaporation of said liquid in said evaporation vessel is directly proportional to said area of said opening of said connecting pipe, a flow rate from said hot heat transfer fluid inlet to said hot heat transfer fluid outlet, a temperature at said hot heat transfer fluid inlet, a temperature at said hot heat transfer fluid outlet, a flow rate from said cold heat transfer fluid inlet to said cold heat transfer fluid outlet, a temperature at said cold heat transfer fluid inlet, a temperature at said cold heat transfer fluid outlet,
wherein said rate of vapor transfer is directly proportional to said area of said opening of said connecting pipe, a flow rate from said hot heat transfer fluid inlet to said hot heat transfer fluid outlet, a temperature at said hot heat transfer fluid inlet, a temperature at said hot heat transfer fluid outlet, a flow rate from said cold heat transfer fluid inlet to said cold heat transfer fluid outlet, a temperature at said cold heat transfer fluid inlet, a temperature at said cold heat transfer fluid outlet, and
wherein a rate of condensation in said condensation vessel is directly proportional to said area of said opening of said connecting pipe, a flow rate from said hot heat transfer fluid inlet to said hot heat transfer fluid outlet, a temperature at said hot heat transfer fluid inlet, a temperature at said hot heat transfer fluid outlet, a flow rate from said cold heat transfer fluid inlet to said cold heat transfer fluid outlet, a temperature at said cold heat transfer fluid inlet, a temperature at said cold heat transfer fluid outlet.

18. The method, according to claim 11,
wherein the step of setting said area of said opening, according to said rate of vapor transfer so as to transfer said vapors from said evaporation vessel to said condensation vessel through said connecting pipe further comprises the steps of:
fixing said area of said opening;
maintaining pressure of said evaporation vessel by temperature variation in said evaporation vessel so as to keep said pressure differential constant, said rate of vapor transfer being constant, said rate of evaporation being constant, said rate of condensation being constant.

19. The method, according to claim 11,
wherein the step of setting said area of said opening, according to said rate of vapor transfer so as to transfer said vapors from said evaporation vessel to said condensation vessel through said connecting pipe further comprises the steps of:
fixing said area of said opening;
maintaining said rate of condensation by temperature variation in said condensation vessel so as to keep said rate of vapor transfer constant, said rate of evaporation being constant.

20. The method as claimed in claim 11, further comprising the step of:
alternately stopping and starting the step of heating said liquid contained in said evaporation vessel and the step of cooling said transferred vapors in said condensation vessel.

* * * * *